Feb. 22, 1966     E. DRACH     3,237,065

TWO SECTION VARIABLE CONDENSER

Filed Oct. 12, 1964

INVENTOR
*Egon Drach*
By *Holcomb, Wetherill & Brisebois*
ATTORNEYS

United States Patent Office 3,237,065
Patented Feb. 22, 1966

3,237,065
TWO SECTION VARIABLE CONDENSER
Egon Drach, Gentilly, France, assignor to Societe anonyme dite: Societe des Ateliers Rene Halfler-meyer Arena
Filed Oct. 12, 1964, Ser. No. 403,053
Claims priority, application France, Jan. 7, 1964, 959,582, Patent 1,389,580
2 Claims. (Cl. 317—254)

In order to avoid interference between the oscillating circuits of two different H.F. stages, or between those of an oscillator and a modulator, it is conventional to provide a variable condenser having two sections, one connected in each of the two oscillating circuits, with a screen mounted between the two sections of the condenser. This screen is fixed to the cage of the condenser.

When the variable condenser is actuated through reduction gearing the thickness of the gearing and the screen both tend to increase the axial length of the condenser unit.

The object of the present invention is to provide a variable condenser provided with reduction gearing through which it is controlled, but having a minimal axial length. The condenser is characterized by the fact that the pinions of the reduction gearing are mounted between the two sections of the variable condenser instead of and in place of the conventional fixed screen, and that the larger of the two pinions has a diameter at least double the maximum radius of the condenser rotor so that it may serve as a screen between the two sections of the condenser regardless of the position of the rotor.

It will be readily understood that the use of a large diameter pinion as a screen makes it possible to reduce the total axial length of the variable condenser by a distance corresponding to the axial thickness of a conventional reduction gearing unit.

The large pinion of the reduction gearing may be provided with an elongated opening in its peripheral portion near its teeth, so as to admit a spacer rod common to the two rotors, which turns at the same speed as the pinion of the reduction gearing through which it passes.

Figure 1:
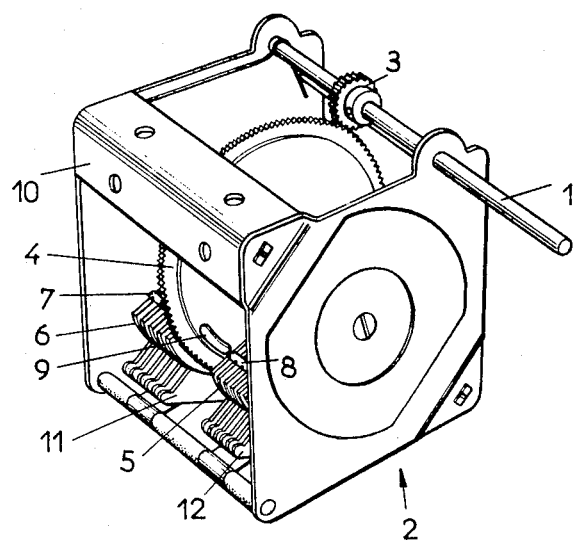
Figure 2:
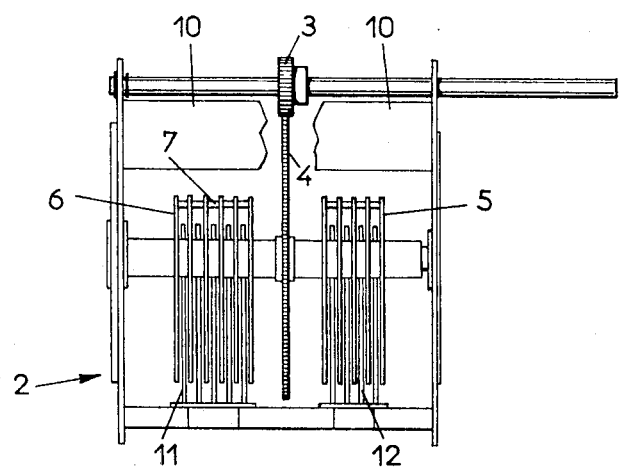

The essential characteristics of the present invention will be better understood from a reading of the following description of one embodiment of the invention, given purely by way of example, and described in conjunction with the attached drawing, on which:

FIG. 1 is a perspective view showing a variable condenser according to the invention; and FIG. 2 is a side elevational view of the same condenser.

It will be seen on FIG. 1 that the control rod 1 of the reduction gearing for the variable condenser 2 drives a small pinion 3 engaging a large pinion 4 having a diameter at least as great as the maximum diameter of the plates forming the rotors 5 and 6 of the variable condenser 2. The pinion 4 constitutes a screen between the rotors 5 and 6, the plates of which are connected by two spacer rods 7 and 8 which may be replaced by a single rod passing through the opening 9 near the periphery of the pinion 4.

The rotors 5 and 6 are turned in synchronism with the pinion 4, which is itself driven by the pinion 3 when the control rod 1 of the reduction gearing is turned.

Regardless of the position of the rotors 5 and 6, when the two insulating or spacer rods 7 and 8 are replaced by a single rod, this rod moves at the same speed as the opening 9, and the pinion 4 continues to act as a screen regardless of the position of the two rotors. The corner members 10 of the condenser frame, shown at the upper left hand corner of FIG. 1, have been omitted in FIG. 2 so that the pinion 4 may be seen more clearly. The stators 11 and 12, shown on FIGS. 1 and 2, have their plates equally spaced from those of the rotors 5 and 6 and the spacer rod 7 of the rotor 6 may be seen on FIG. 2.

It will of course be appreciated that the specific embodiment herein described may be modified as to detail, or added to, and that elements thereof may be replaced by their mechanical equivalents without thereby departing from the basic principles of the invention.

What is claimed is:
1. A two section variable condenser comprising a frame, two stator sections carried by said frame, two rotor sections, one interleaved with each stator section, a mounting rod rotatably carried by said frame and on which said rotor sections are fixed, a large pinion fixed to said mounting rod between said rotor sections, and drive means peripherally engaging said pinion, the diameter of said pinion being at least double the maximum radial distance from the axis of said mounting rod to the periphery of a rotor section, so that said pinion serves as a screen between said condenser sections.

2. A condenser as claimed in claim 1 in which the rotor sections each comprise a plurality of blades and all of the blades of both sections are fixed to a single spacer rod, said pinion being provided with an opening through which said spacer rod projects.

References Cited by the Examiner
UNITED STATES PATENTS
1,702,833  2/1929  Lemmon _____ 317—254
2,764,674  9/1956  Barton _____ 317—254

ROBERT K. SCHAEFER, *Primary Examiner.*
E. GOLDBERG, *Assistant Examiner.*